United States Patent

[11] 3,552,324

| [72] | Inventors | Harold M. Schilf<br>Birmingham;<br>Louis A. Letanosky, Fairfield, Ala. |
|---|---|---|
| [21] | Appl. No. | 746,537 |
| [22] | Filed | July 22, 1968 |
| [45] | Patented | Jan. 5, 1971 |
| [73] | Assignee | Pullman Incorporated<br>Chicago, Ill.<br>a corporation of Delaware |

[54] HOPPER CAR HATCH AND COVER ASSEMBLY WITH SPRING LOADED SEAL PIN LOCKING ARRANGEMENT
5 Claims, 3 Drawing Figs.

| [52] | U.S. Cl. ................................................ | 105/377 |
| [51] | Int. Cl. ........................................... | B61d 39/00 |
| [50] | Field of Search .......................................... | 105/377, 408; 50/14 |

[56] References Cited
UNITED STATES PATENTS

| 2,816,683 | 12/1957 | Miers et al. .................. | 105/377 |
| 2,873,696 | 2/1959 | Cisco ........................... | 105/377 |
| 2,931,323 | 4/1960 | Shaver et al. ................. | 105/377 |
| 2,985,118 | 5/1961 | Maharick et al. ............. | 105/377 |
| 3,022,536 | 2/1962 | Floehr .......................... | 105/377 |
| 3,330,225 | 7/1967 | Barry ............................ | 105/377 |

*Primary Examiner*—Drayton E. Hoffman
*Assistant Examiner*—Richard A. Bertsch
*Attorney*—Hilmond O. Vogel and Wayne Morris Russell ABSTRACT: A railroad hopper car hatch opening is provided with a cover hingedly connected to the roof structure of the car and a latch mechanism is provided for latching the cover in a closed position. The latch mechanism includes a hinged arm which clampingly engages a flanged hinge strap to secure the cover. The free end of the hinged arm is locked in the latched position by its engagement within a recess provided by a pair of upstanding bracket members, and a spring loaded pin engages and maintains the arm in its latched position, with the pin including an aperture through which a car seal may be inserted.

PATENTED JAN 5 1971
3,552,324
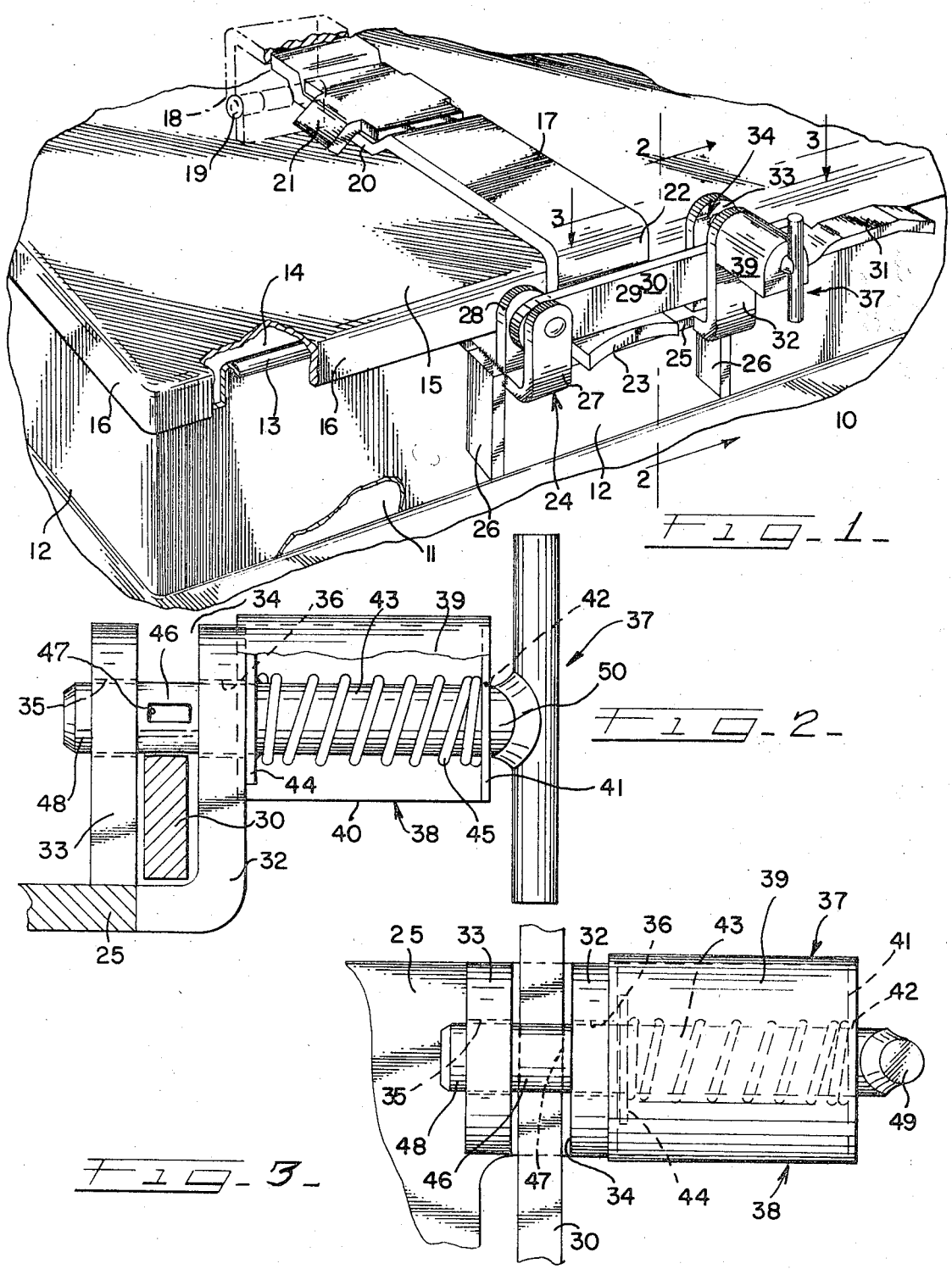
INVENTORS
HAROLD M. SCHILF
LOUIS A. LETANOSKY
BY Hilward O. Vogel
ATT'Y.

3,552,324

HOPPER CAR HATCH AND COVER ASSEMBLY WITH SPRING LOADED SEAL PIN LOCKING ARRANGEMENT

BACKGROUND OF THE INVENTION

1. Field of the Invention

The invention relates to the art of railroad hopper cars. Such cars include a roof construction having one or more openings through which material may be loaded into the interior of the car. The hatch openings may have individual separate covers or in the case of a trough hatch assembly, may include one or more elongated hatch covers which include suitable securing latch mechanisms so that the interior of the hopper car may be effectively sealed.

2. Description of the Prior Art

The prior art is disclosed in the Shaver et al. U.S. Pat. No. 2,931,323 wherein a triangular hatch opening is provided with a hinged cover having a suitable locking arm suitably connected to be moved into a latched position for maintaining the cover closed, and further includes a pin arrangement adapted to be inserted in a manner to prevent the hinged latch arm from accidentally becoming unlocked. The Radey et al. U.S. Pat. No. 3,259,078 also shows an elongated hatch opening and cover therefor. This patent also discloses a similar hatch cover arrangement wherein a pair of hinge straps are secured in a closed position by means of latch arms which are secured by a manually insertable pin arrangement.

The present invention is an improvement over the aforementioned constructions and includes a spring loaded pin and seal arrangement which is biased into a locking position relative to a hinged latch arm so that the same is maintained in a latched position during train operation.

SUMMARY

A hatch cover assembly which is normally maintained in closed relation with respect to a roof hatch opening is maintained in a latched position by means of a hinged arm engaging a projecting portion of the cover. The latch arm is positively engaged by a pin arrangement including a spring loaded pin which prevents the hinged latch arm from becoming unlocked.

BRIEF DESCRIPTION OF THE DRAWINGS

FIG. 1 is a perspective view of a hatch cover and opening assembly including the improvement for locking the latching assembly in position;

FIG. 2 is a cross-sectional view taken substantially along the line 2-2 of FIG. 1; and FIG. 3 is a cross-sectional view taken along the line 3-3 of FIG. 1.

DESCRIPTION OF THE PREFERRED EMBODIMENT

Referring to the drawings, a hopper car roof is designated by the reference character 10, the same being formed in a conventional railroad hopper car. The roof 10 includes a longitudinal opening 11 communicating with the interior of the hopper car, as best shown in FIG. 1. An upwardly extending hatch coaming 12 is coextensive with a hatch opening 14 which is adapted to be opened and closed by a hatch cover 15 having a downwardly projecting flange 16. The hatch cover 15 includes a suitable seal or gasket arrangement (not shown) extending about its periphery and being adapted to engage a curved flange 13 of the hatch coaming 12. The aforementioned patents disclose such a gasketing arrangement. The hatch cover 15 includes one or more hinge straps 17 which extend horizontally across the top of the cover 15. As schematically shown in broken lines of FIG. 1, the hinge strap 17 is provided at one extremity with a hinge member 18 extending downwardly and being suitably hingedly connected by means of a hinge bracket 19 to the upstanding coaming 12. The hinge strap 17 is provided with a depressed center section 20 which provides a pocket for receiving a strap retainer 21 suitably welded to the top of the hatch cover 15. Thus the cover 15 is secured to pivot with the hinge strap 17. The forward end of the hinge strap 17 is provided with a downwardly extending portion 22 having at its lower end a horizontally extending or projecting flange 23.

For each hinge strap 17 there is provided a latching arrangement generally designated at 24. The latching arrangement 24 comprises a horizontally extending base member 25 which may have one side thereof (not shown) suitably secured to the upstanding coaming 12. Further, the base member 25 is supported in position by means of horizontally spaced vertically extending support gussets 26 which are suitably welded to the base 25 and to the coaming 12. One end of the base 25 is provided with a pair of upwardly extending ears 27 and 28 which have connected thereto a hinge pin 29 hingedly mounting a hinged lever or latch arm 30 provided at its free end with a hand-hold portion 31. The other end of the base 25 is provided with an upstanding ear 32 in horizontal alignment with the ear 27, and another ear 33 extends upwardly from the base 25 and is in alignment with the ear 28, the said ears providing a recess 34, as best shown in FIGS. 2 and 3. The ear 33 is provided with a bore 35 which is in horizontal alignment with a bore 36 provided in the ear 32.

A locking arrangement for maintaining the latch 30 in the position shown in FIG. 1 is indicated by the reference character 37. The locking arrangement 37 comprises a housing 38 having a wall 39 extending in inverted U-shaped fashion and being suitably connected to the ear 32, as best shown in FIGS. 2 and 3. The housing 38 is open at its lower end, as best indicated by the reference character 40 in FIG. 2. The housing 38 is closed at one end by means of a rear wall 41 having an opening 42 which is in horizontal alignment with the bores 35-36. A pin 43 extends through the bores 35-36-42, as best shown in FIG. 2 and the pin 43 further includes a spring retainer 44 suitably welded to a portion of the pin 43 maintained within the housing 38. A coil spring 45 is positioned around the pin 43 and is held captive within the housing by means of the spring retainer 44 and the wall 41.

The pin 43 is also provided an annular section 46 having therethrough an aperture 47 through which a car seal may be inserted. The end portion 48 of the pin 43 in its engagement with the bore 35 rigidly maintains the arm 30 in the locked position shown in FIGS. 2 and 3. A handle 49 is connected to another end portion 50 of the pin 43 whereby the operator may, upon pulling the handle 49, provide for the disengagement of the pin 43 from the bore 35 into a position where the latch arm 30 may be pivoted out of its closed position.

In the position shown in FIG. 1, the hatch cover 15 is in a closed or latched position relative to the hatch opening 14. The arm 30 is in a horizontal latched position with its lower edge clamping the flange 23 downwardly so that the cover 15 is securely held in the closed position. During transport of the railroad car, a car seal will be contained within the slot 47 and the reduced portion 46 firmly engages the upper edge of the arm 30 to retain the same in the locked position. Despite constant vibrations occurring from over-the-road travel, the pin 43 will be retained in the locked position by means of the coil spring 45. Upon reaching the destination the operator merely severs the car seal and withdraws the same from the slot 47 whereupon he now pulls on the handle 49, as above indicated, to permit the latch arm 30 to be swung to a vertical out-of-the-way position so that the hatch cover 15 is now free to be pivoted to an open position.

Thus, the spring loaded pin 43 and seal assures the continued locking of the latch arm 30 under all operating conditions and the housing 38 serves to protect the spring and pin assembly against damage during operation. Since the lower end of the housing 38 is open as indicated at 40, there is little likelihood of foreign objects being trapped within the interior of the housing 38 and being of such character that they could lead to possible malfunction.

We claim:

1. In a hopper car having a roof provided with a hatch opening including an upstanding coaming surrounding said opening, a hatch cover mounted on said roof and movable to engage said coaming to close said opening, said cover including a horizontally projecting flange in the closed position extending outwardly of the coaming, a hinge bracket supported on said roof on one side of said flange including an arm hingedly connected to said hinge bracket, said arm in the closed position extending horizontally, and overlying and engaging said flange, a locking bracket supported on said roof on the opposite side of said flange, said locking bracket having a pair of upstanding ears providing a recess for receiving a free end of said arm in the closed position, said ears having a pair of aligned openings disposed above said arm in its horizontal position, the improvement of a locking arrangement comprising pin supporting means positioned in laterally spaced relation adjacent to said ears, a pin slidably supported on said supporting means and guided thereby through said aligned openings, and spring means between said supporting means and said ears for biasing said pin through said openings whereby said pin engages and locks said arm within said recess.

2. The invention as defined in claim 1 wherein said pin supporting means including a housing supported on one of said ears and including a vertical wall having a third opening in horizontal alignment with said other aligned openings, said pin extending through said three openings, and a handle on said pin whereby said pin may be moved against said spring for withdrawing the same from said recess and said arm may be moved to an unlocked position.

3. The invention as defined in claim 2:
said pin including a spring retainer element connected to said pin; and
a coil spring on said pin held captive between said retainer element and said vertical wall.

4. The invention as defined in claim 3, said housing including a wall substantially enclosing said spring and said housing having an underneath open side.

5. The invention as defined in claim 4, said pin having a portion disposed within said recess which includes a seal receiving aperture.